March 8, 1932.  H. A. W. WOOD  1,848,593

SELF ACTING STEREOTYPE PLATE MAKING MACHINE

Original Filed April 19, 1929  9 Sheets-Sheet 4

March 8, 1932. H. A. W. WOOD 1,848,593

SELF ACTING STEREOTYPE PLATE MAKING MACHINE

Original Filed April 19, 1929  9 Sheets-Sheet 7

Inventor
Henry A. Wise Wood
By attorneys
Southgate Fay & Hawley

March 8, 1932. H. A. W. WOOD 1,848,593
SELF ACTING STEREOTYPE PLATE MAKING MACHINE
Original Filed April 19, 1929 9 Sheets-Sheet 8

Inventor
Henry A. Wise Wood
By attorneys

Patented Mar. 8, 1932

1,848,593

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

SELF ACTING STEREOTYPE PLATE MAKING MACHINE

Application filed April 19, 1929, Serial No. 356,494. Renewed June 29, 1931.

This invention relates to the type of machine known as the Junior Autoplate in which the operations of casting a stereotype printing plate, trimming its ends and removing it from the mold have been accomplished by manual control. This is shown in my United States Patents Nos. 1,009,211, 1,009,272 and 1,009,367.

The principal objects of this invention are to provide, in a similar machine, means whereby, instead of this manual control, the operator initiates the action of the machine by electricity under push button control; to provide a pump of the same general construction as that used with the Junior Autoplate machines heretofore manufactured but has its handle made in such a way that it can be changed for providing automatic electrically controlled operation or operation by hand; to provide for taking care of excessive strains in the mechanism for transmitting power to the pumping mechanism so that if they occur, the connection through the power will be relieved automatically without doing any damage to the parts; to provide improved cam connections for operating the back to open and close the mold; to provide means by which by a simple change the casting box can be operated by hand and also the rotation of the cylinder of the casting box can be controlled by hand; to provide a connection between the casting box and the means for controlling the rotation of the cylinder to automatically control the connection of the cylinder with the motor for operating it, controlled by the position of the back, so that the cylinder will not rotate automatically until the back is opened; to provide means whereby when, and only when, the matrix clip and bar are in proper position can the motors be started for operating the machine; to provide a yielding connection for avoiding injury to the parts when the teeth of the clutch for connecting the cylinder with its power strike on top of each other on closing; to provide means whereby on the dropping of the cam roller into the cam which stops the rotation of the cylinder it will not cause any material rebound of the mechanism that might cause the clutch teeth to be re-engaged; to provide means whereby a button for controlling the pouring is operative when the casting box is in either open or closed position and the pushing of that button will cause the casting box to close, if open, to pour the metal, to turn the pump to inactive position and then stop; to provide means whereby the pushing of the button for the pouring of the metal will cause the last three of said operations and no attention need be paid to the position of the mold, this mechanism embodying means for rendering this button inoperative after the casting has been made until the casting box is then opened again, whereby the pouring of metal into the mold after it is full is prevented; to provide means whereby the pressing of the button for pouring will control the turning of water into the hollow parts of the cylinder and casting box and whereby the water will be shut off automatically when the casting box is opened; to provide means for preventing the stopping of the motor operating the casting box while the normal operation is going on; to provide improvements in the saw hanger cam which operates the saws into position for cutting off the tail and trimming the end of the casting; to provide improved means for disconnecting the saw hanger from its cam to allow it to be operated by hand; to provide means for locking the saw hanger in its outermost position so that the cylinder of the mold can be turned by hand without operating the saws; to provide safety devices for preventing the wrong operations being performed; to provide an automatic electric system for controlling all these operations, and to provide simple means whereby each part of the machine can be set up to be operated by hand without operating the other parts.

Other objects and advantages of the invention will appear hereinafter.

Reference is to be had to the accompanying drawings in which.

In the so-called Junior Autoplate machine referred to above, the casting box is opened manually and the pump is operated by a handle by the operator. As stated, this invention is designed to provide an electric control whereby the operator simply pushes different ones of a set of push buttons and controls the whole operation of the machine and yet parts can be changed very readily so that any of the different parts can be operated by hand at will. The machine is intended to be operated by two motors or some equivalent power mechanism, one to turn the casting box cylinder and the saws and the other to perform all the other operations.

A reversing motor, not shown, is geared up to a gear 1, which by a grooved breaking pin 2, is connected with a hub 3 on a shaft 4. This shaft is mounted in ball bearings on the frame 5 and provided with a worm 6. The worm drives a worm gear 7 fixed on the shaft 8. On this shaft 8 are two cams 9 and 10 arranged back to back. The motor, which drives this mechanism operates a certain number of turns to turn the shaft 8 practically through a circle and then backwardly to the place of starting. Thus these cams are not rotary but oscillatory. The cam 10 is provided with a cam roller 11 on a lever 12 which has a gear segment 14. The segment 14 meshes with a segment 15 fixed on a shaft 16 and having two arms 17 extending therefrom. These arms, by links 18 operate the vertical back 19 of the casting box and give it a to and fro movement on its rolls 20 which run on a track 21, the purpose of which is well understood.

The connection between each arm 17 and the link 18 is in the form of an eccentric stud 23, the position of which can be adjusted by a pivot screw 24 and nut 25. The pivot screw passes through a pair of separated lugs 26 on the arm 17.

Figures 5, 6, 7, 8, 9, 10:
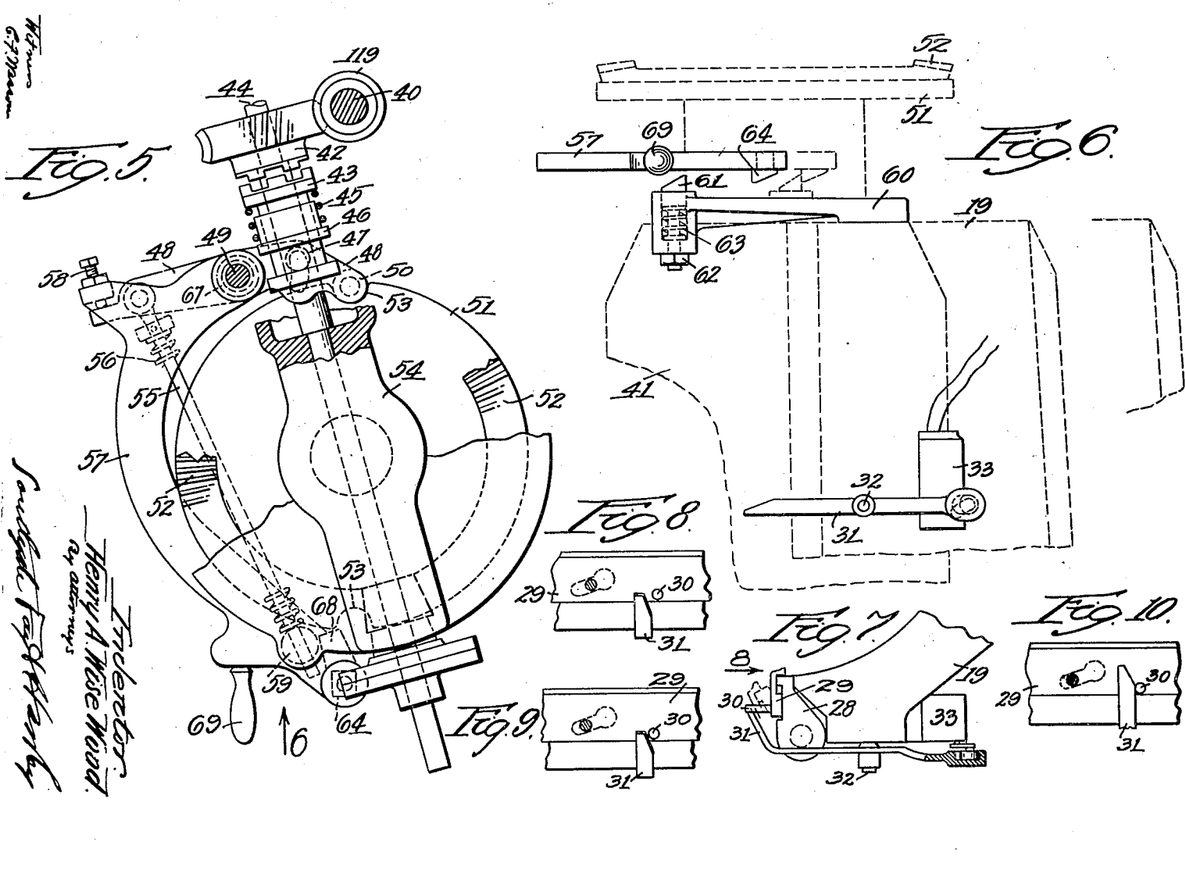
Fig. 5 is an enlarged plan, partly in section, of the top of the cylinder of the mold and the means for operating it.
Fig. 6 is a side view of the top of the casting box showing the means for connecting it with the cylinder to control the operation of the latter.
Fig. 7 is a plan of one edge of the casting box showing the open and closed position of the matrix bar and clip.
Fig. 8 is an edge view of the matrix bar in open position.
Fig. 9 is a similar view showing it in closed position.
Fig. 10 is a similar view showing it locked in closed position.
Figures 11, 12:
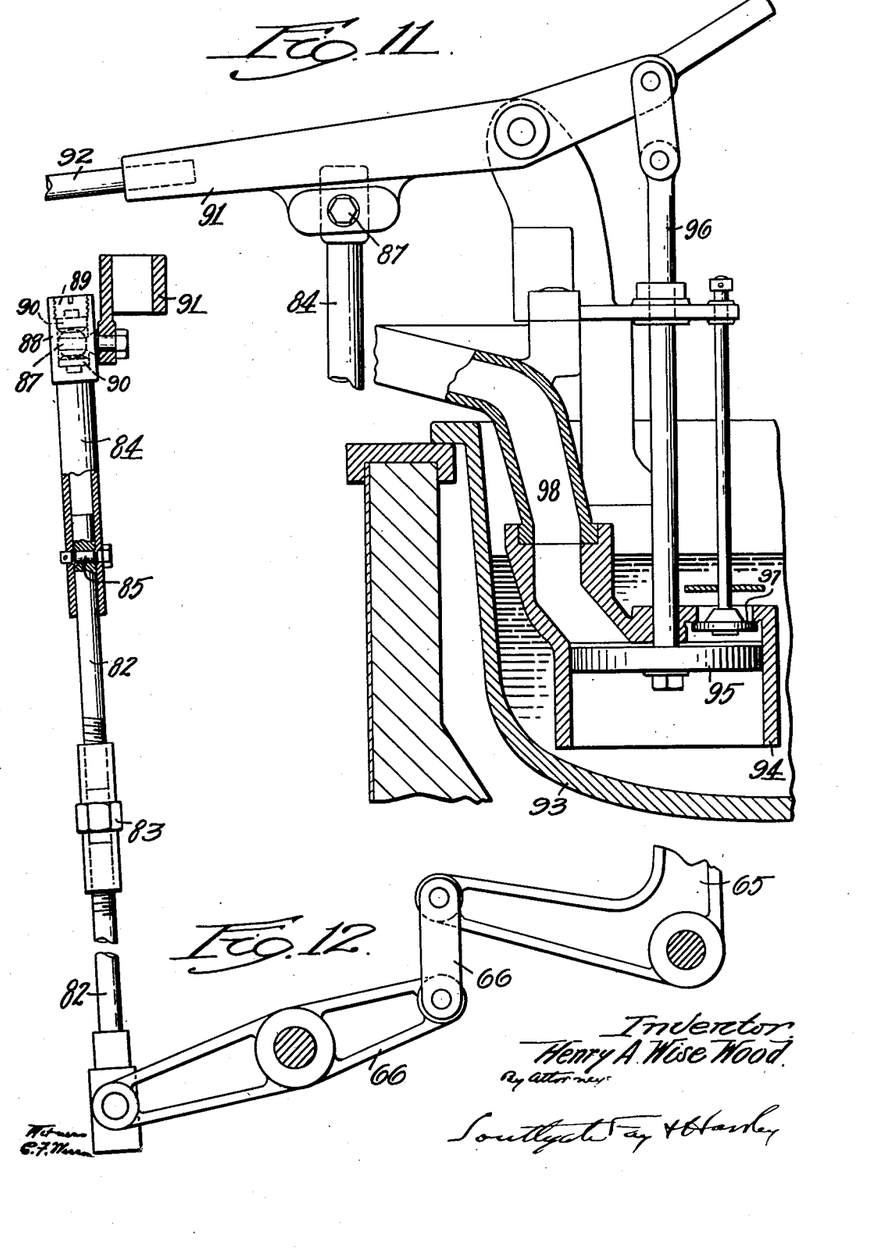
Fig. 11 is a diametrical sectional view of the pump.
Fig. 12 is a side elevation, partly in section of the connections for operating the pump from its operating cam.

In order to be able to close the casting box without damage to the machine, the matrix bar 28 which is pivoted in the usual way, must be open and the sliding matrix clip 29 closed, as shown in dotted lines in Fig. 7. On the clip 29 is a pin 30 adapted to press against the lever 31 which is pivoted on a stud 32 secured to the casting box or back 19. Thus when, and only when, the clip and bar are in the proper position, as shown in Fig. 10, an electrical contact is made in a safety switch 33, the purpose of which will appear later. It may be stated now, however, that the safety switch is connected in a red button circuit in such a way that neither motor circuit can be established until in contact with this switch. A switch 33 and lever 31 is provided for each clip and they are connected in series.

Fig. 9 shows the matrix bar closed and the clip closed and the levers 31 do not establish a contact in the switch 33. Fig. 8 shows the matrix bar closed and the clip open. In neither of these positions may either motor be started. In the normal operation of the machine, however, the matrix bar closes when the casting box comes up to the cylinder. At that time the electrical contact is broken in the safety switch 33.

I have also provided a short circuit switch 35 mounted on the frame 5 and a lug 36 is fixed to the saw hanger cam 37. When an electrical contact is made by the switch 35 just as the matrix bars are closing, the stopping of the motor under the normal operation is prevented. Such a contact between 35 and 36 short circuits out the two safety switches 33, leaving them inoperative as long as the casting box is closed.

As previously stated there is a second motor 13 for operating the cylinder 41. This motor, through bevel gearing 27, a shaft 40 and worm 119, drives a clutch section 42. The opposite clutch section 43 which is slidably splined on a shaft 44 is pressed toward the first clutch section by a spring 45. This spring rests against a grooved collar 46 which is operated by a roll 47 on a lever 48 pivoted on a stud 49. The lever has a cam roll 50 operated by a cam 51, as usual.

The shaft 44 through a bevel pinion operates the crown gear 52 mounted on the cam 51 and rotates the cylinder 41 until the roll 50 comes down into one of the two opposite notches 53 in this cam as is usual in this class of machines.

The shaft 44 is supported in a bracket 54 extending across the top of the cylinder diametrically. The lever 48 is yieldingly pressed into a position to cause the roller 50 to enter the notches 53 by a rod 55 having a long spring 56 thereon, the other end passing through a poppet 59. The lever 48 is really made in two pieces, the other one comprising an arm 57 pivoted on the stud 49 and having an extension adapted to carry an adjusting stop screw 58, engaging the lever 48 to limit its motion. This connection with the spring 56 prevents the whipping of the arm 57 when the spring forces the roller 50 into one of the notches in the cam. Dropping the cam roller into the notch causes the disengagement of the clutch teeth through the operation of the roller 47 and any considerable rebound of the mechanism would cause the clutch teeth to be re-engaged. This would send the cylinder around another half revolution which, of course, is undesirable.

The function of the spring 45 is to take care of those times when in pulling the clutch teeth together the teeth strike top to top. Enough spring yielding motion is provided by this spring so that when the two sets of clutch teeth come together while stationary, touching top to top, there can be no damage by pulling the arm 57 until the other mechanism is in operation.

The other mechanism just referred to comprises an arm 60 attached to the casting box 19 and carrying a toe 61, the upward movement of which is limited by a nut 62. The toe is supported underneath by a spring 63 making it a spring latch. As the casting box recedes from casting position, the toe 61 comes in contact with a toe 64 secured to an arm 57.

The toes 61 and 64 clear each other before the casting box finishes its backward stroke because the toe 61 moves in a straight line while the toe 64 swings in an arc around the center of the stud 49. By the time these toes have cleared each other, the cylinder has begun revolving and the cam roller 53 is riding on the high portion of the cam 51.

The clutch portions are held in mesh and the arm 57 is swung slightly in counter clockwise direction pressing the spring 56 against the poppet 59 which supports the end of the rod 55. When these toes clear each other the arm 57 is then free to return to its original position. It does this by the action of a spring 67 coiled around the stud 49. The limit of the return is governed by a lug 68 striking against the poppet 59. It will be seen now that the spring 56 yields until the toes 61 and 64 clear each other as in normal operation. The toes 61 and 64 have their back edges beveled so that, on closing of the casting box, the former is pushed down against its spring until they pass by each other. On the arm 57 is a handle 69 by which it can be manipulated about its pivot when desired.

On the switch board is a button 70 for controlling the pouring in a way that will be described later. This button is connected with an electric circuit for controlling the pouring and with another circuit. When the switch is closed by the button, both circuits are energized. The second circuit is connected in series with a solenoid 71. The plunger 72 of the solenoid is connected by a link 73 and valve stem 74 with a valve in the supply pipe 75. The energizing of the solenoid opens the valve and turns on the water which flows through the hollow cylinder and back. This is purposely arranged so that this will happen just as the metal starts to flow into the mold. When the solenoid is de-energized the water is shut off. The weight 76 performs this operation, positively closing the valve when the solenoid is not energized. When the back recedes from the cylinder the switch 127 is opened and the water supply shut off.

In case of failure of any electric apparatus to work, provision is made for hand operation of the valve. A handle 77 is pivoted on the frame by a stud 78. The end of the solenoid plunger 72 projects through the top of it and has a slot through which a pin 79 on the handle 77 projects. The electrical circuit provides establishment of electric current to open the water valve and the action of the weight to close it. The opening of the switch 127 through the connections on the control board, deenergizes the solenoid 71 allowing the weight to close the valve.

The cam 9 operates a lever 65 which is connected by links 66 with a connecting rod 82. This connecting rod is made in three parts, two of them connected by a turn buckle 83 for adjustment and the other part comprising a sleeve 84 into which one of the rods 82 enters. The sleeve and rod are connected by a shear pin 85, shown as grooved in two places to take care of excessive strain. Enough clearance is allowed so that at whatever part of the stroke the shear pin breaks, the connecting rod telescopes into the sleeve 84 preventing any further strain and preventing the connecting rod and sleeve getting out of alignment. The sleeve, which of course is operated by the cam 9, is connected with a handle 91 by a ball stud 87.

The connection of this ball stud with a hollow end 88 on the sleeve 84 is made by means of a plug 89 and two cup shaped retainers 90 held in by this plug. The ball stud is provided with a ball between the two retainers and with a shank or stud connected with the handle 91.

The handle of the pump is made in two pieces, the handle proper 91 and the handle extension 92 which is used for operating the pump by hand and is intended to be removed during the normal mechanical operation of the machine. The regulation of the stroke of the pump is accomplished electrically by varying the point at which the worm wheel 7 reverses and this will be described below.

The pump may be constructed the same as previously described in my above mentioned patents and will merely be described in order to complete the operative structure. It involves a melting pot 93, a cylinder 94, and a plunger 95 connected by a rod 96 to the operating lever 91. The valve 97 operates automatically by the movement of the metal and the metal is pumped on the up-stroke of the plunger 95 ino the spout 98 and into the mold.

The saw shaft for trimming the ends of the plate is controlled by the cam 10 fixed on the shaft 8. On the shaft 16 is fixed the saw hanger operating cam 37, as stated, so this cam will oscillate with this shaft and in proper relation to the opening and closing of the casting box. The operation of the saw hanger is the same as in my said patents on the Junior Autoplate machine through a cam lever 100 which is oscillated on its stud 101 by a roll operating in the groove of the cam 37. Connected with this lever is a lever 102 connected by a link 103 with the saw frame for oscillating the latter.

Figure 16:
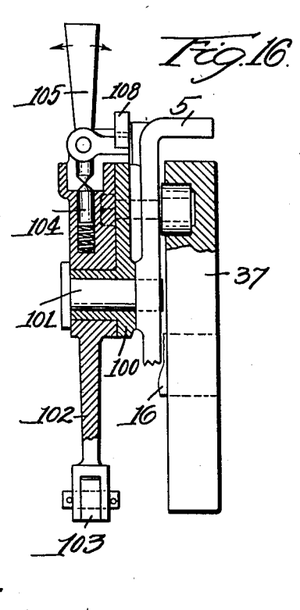
Fig. 16 is a sectional view of the same on the line 16—16 of Fig. 15.
Figure 17:
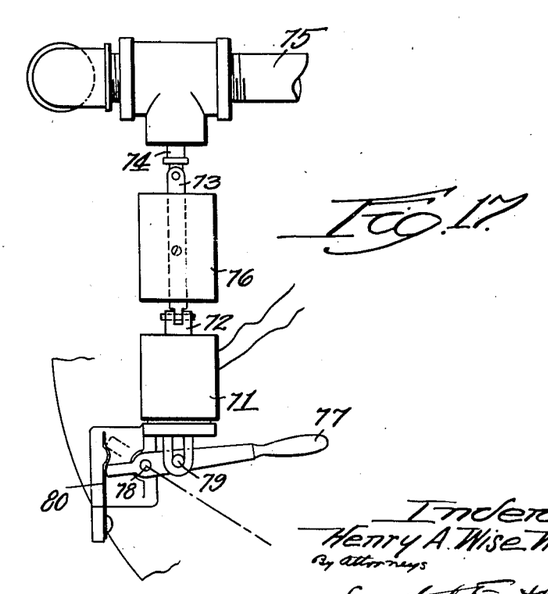
Fig. 17 is a side elevation of the means for controlling the cooling water.
Figure 18:
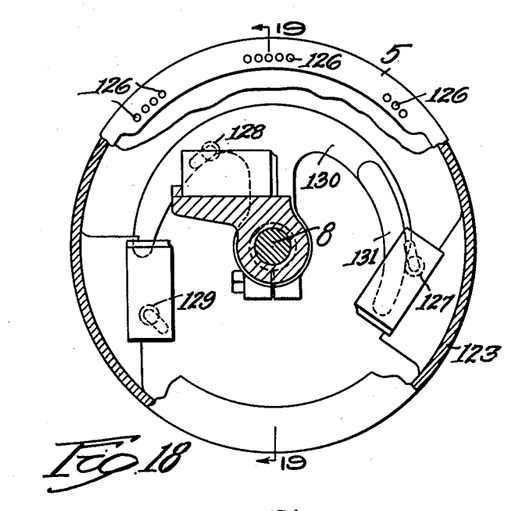
Fig. 18 is an end view of the switch cam and electrical connections.
Figure 19:
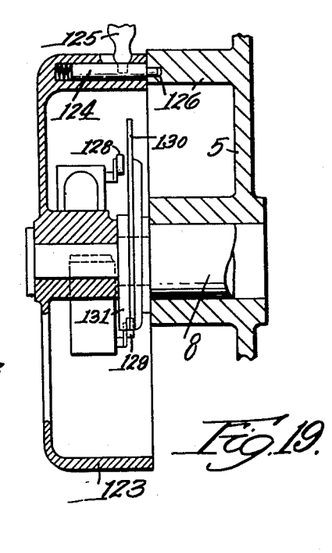
Fig. 19 is a diametrical sectional view of the same on the line 19—19 of Fig. 18.

The means for disconnecting the saw hanger from its cam used in this machine is novel, however. The saw hanger lever 102 is detachably secured to the cam lever 100 through a spring-pressed pin 104 and a bell crank latch handle 105 pivoted on the lever 102. In normal running condition the end of the latch handle 105 rests in a notch 106 in the lever 100 and the levers 100 and 102 oscillate together. By moving the latch handle 105 to a central position as shown in Fig. 16, disengagement from the notch 106 in the lever 100 is accomplished. The saw hanger is disconnected from its operating cam in this way and can be swung in or out freely.

In addition to this method of disconnecting the saw hanger, provision is made for locking the saw hanger in its outermost position by moving the latch handle 105 to the left as shown in Fig. 16. It is made to enter a notch 107 in a block 108 mounted in stationary position on the frame 5. This holds the saw hanger rigidly in one position regardless of whether or not the saw hanger cam moves. The pin 104 and latch handle 105 are so designed that the latch handle 105 will be held in whatever notch it is placed. The levers 100 and 102 are both pivoted on a stud 101 and connected in the above mentioned manner.

The saw hanger comprises a vertical pivot shaft 110 mounted on brackets 111 attached to the side frame of the machine. This shaft has hangers 112 oscillatably mounted thereon and provided with bearings for a vertical saw shaft 113. This carries the cutting saw 114 and the trimming saw 115 and also carries a pinion 116. The cutting saw is held by collars 117 on each side which can be removed and replaced by others of different lengths to secure the desired distance between two saws for the varying lengths of the plates.

End-play vertically with respect to the shaft 113 is avoided by the clamping of the two lower ball bearings in their respective seats in the saw hanger proper. The link 103 is connected pivotally to an arm 118 on the shaft 110 to oscillate the saw hanger.

Figures 13, 14:
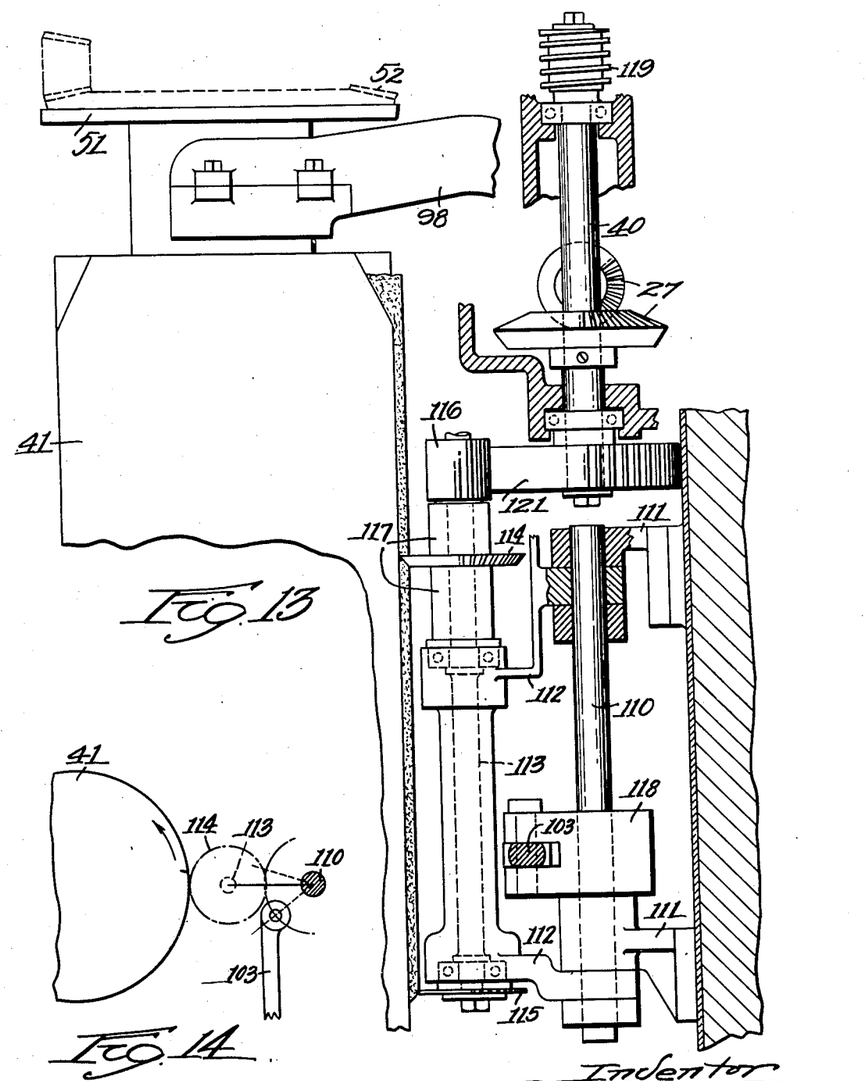
Fig. 13 is a sectional view of the printing plate on its cylinder and the cutting and trimming saws and other operating mechanism.
Fig. 14 is a diagrammatic plan showing the movements of the trimming saw.
Figure 15:
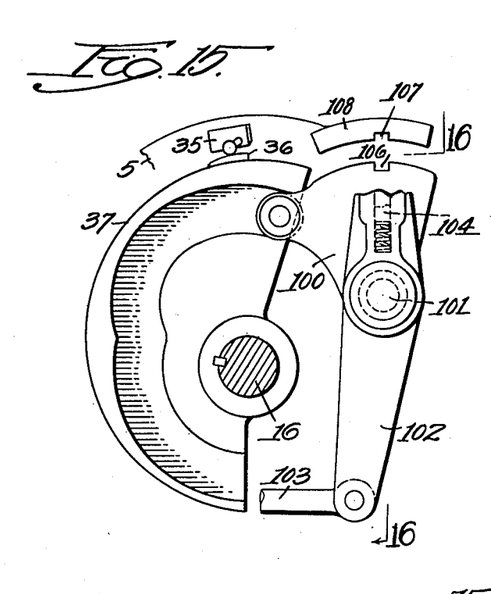
Fig. 15 is an end view of the saw cam and connected parts.

The power for rotating the saws is received from a motor 13 or other source of power, through the bevel gears 27 on the shaft 40. On this shaft is a gear 121 meshing with the pinion 116 and driving the same. The shaft 40 is also mounted in ball bearings above and below. The operation of the saw hanger is indicated in the diagrammatic view in Fig. 14.

On the end of the shaft 8 is located a cover 123 with its hub free on the shaft and adapted to be latched to a stationary part of the frame in which the shaft 8 has its bearing by means of a spring-pressed pin 124 and a handle 125 projects through a slot in this cover. This pin is adapted to extend into any one of an arcuate series of holes 126 in the frame so as to locate this cover in stationary position and regulate that position to control the amplitude of oscillation of the shaft.

Electrical means is provided for furnishing this control through the circuit of the motor which runs the shaft 4. The switch 128 is fixed to the cover, switches 127 and 129 are attached to the frame of the machine. On the shaft is fixed a switch cam 130 having a toe 131 for operating the switches 127 and 128. The cam itself has an outside cam surface for operating the limit switch 129. It will be seen that the time of operation of switch 128 will depend upon the adjustment of the cover 123 by the pin and hole connection 124—126.

The push button station is mounted on the frame of the machine in a convenient place for the operator. The several buttons 70, which has been referred to as the "pouring" button, 132 the "saw" button, 133 the "stop" button, 134 the "open" button and 135 the "close" button, are located at this station. It will be sufficient here to state that these buttons control the actions indicated by the words just used in describing them. The way in which they act will be seen from the wiring diagram, Fig. 23. Buttons 134, 135 and 70 are starting contacts while switches 127, 129 and 128 are limits, respectively. The button 70 and the reversing limit switch 128 are in the same circuit.

Figure 4:
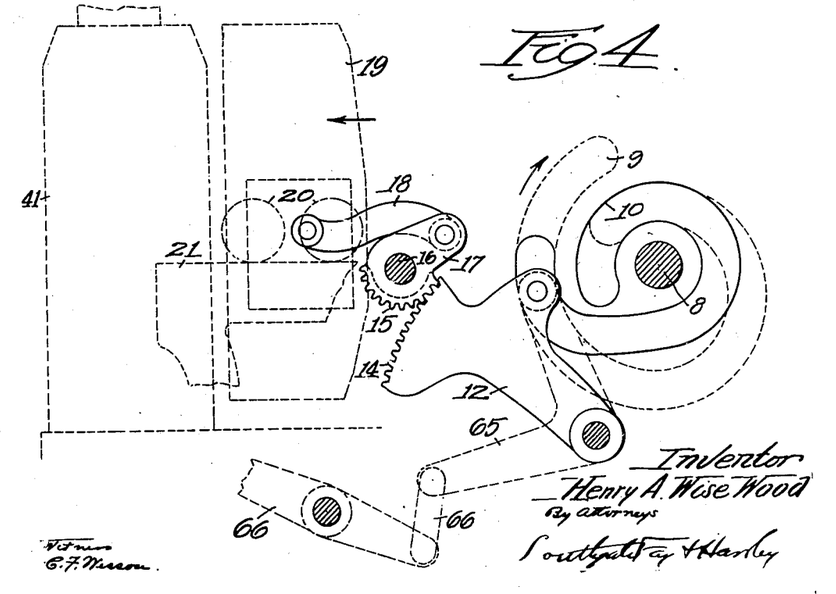

By pressing the saw button 132, the motor 13 driving the cylinder and the saws is started up. It runs continuously until the "stop" button 133 is pressed. The "stop" button is connected by certain circuits, so that, by depressing it at any time during any operation, both motors, if running, will be stopped. Pressing of the "open" button 134 causes the control motor, which is connected with the shaft 4, to revolve the shaft 8 in a counter-clockwise direction to open the mold until the outside surface of the cam toe 131 opens the electrical contact in the limit switch 127. The opening of the electrical contact in the limit switch 127 makes the "open" button 134 inoperative by the circuit in which they are connected and does that when the casting box is open, as shown in Fig. 4.

Figure 3:
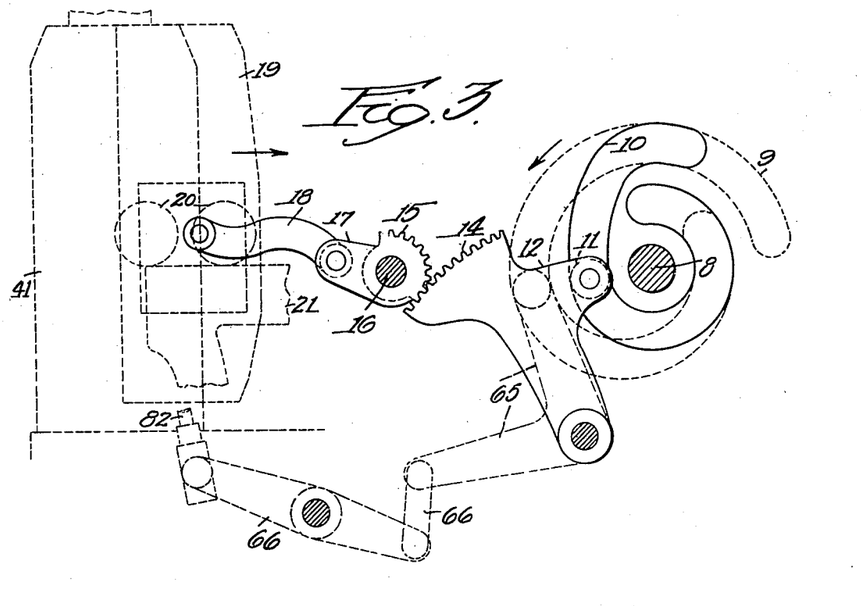
Figs. 3 and 4 are two skeleton views showing the operation of the back.
Figure 20:
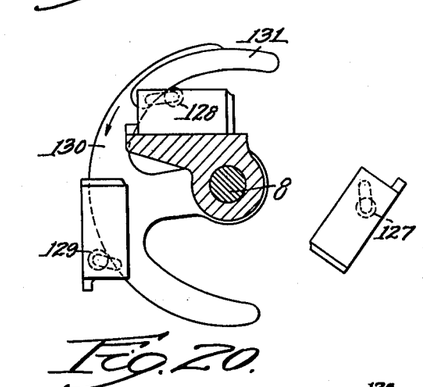
Figs. 20, 21 and 22 are views of the switch cam in different positions.
Figure 21:
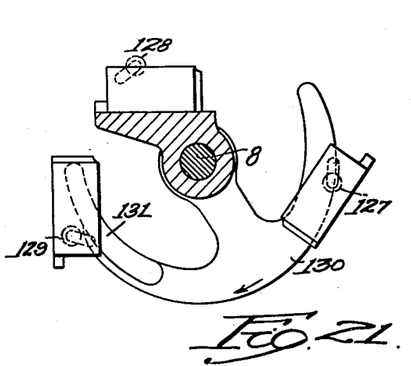
Figure 22:
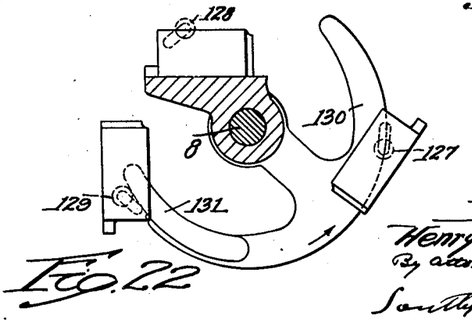

Pressing of the "close" button 135 causes the control motor to revolve the worm wheel 7 in a clockwise direction to close the mold until the outside surface of the cam 130 opens the electrical contact in the limit switch 129. In this position, the casting box is closed but no metal has been pumped into the mold. This position of the casting box is shown in Fig. 3 and the corresponding position of the cam 130 is shown in Fig. 21. Pressing of the "pour" button 70 causes the control motor to revolve the worm wheel 7 in a clockwise direction until the inside surface of the cam toe 131 opens the electrical contact in the limit switch 128. At this point, as shown in Fig. 20, the motor automatically reverses and revolves the worm wheel 7 in a counter-clockwise direction until the switch cam 130 allows an electrical contact to be remade in the limit switch 129. This is shown in Fig. 22. Thus the machine goes through an entire cycle of operations, closing and opening the mold and pouring the metal. It is stopped in the same position as when fully closed except for the overrun of the motor. This position is shown in Fig. 3.

Figure 1:
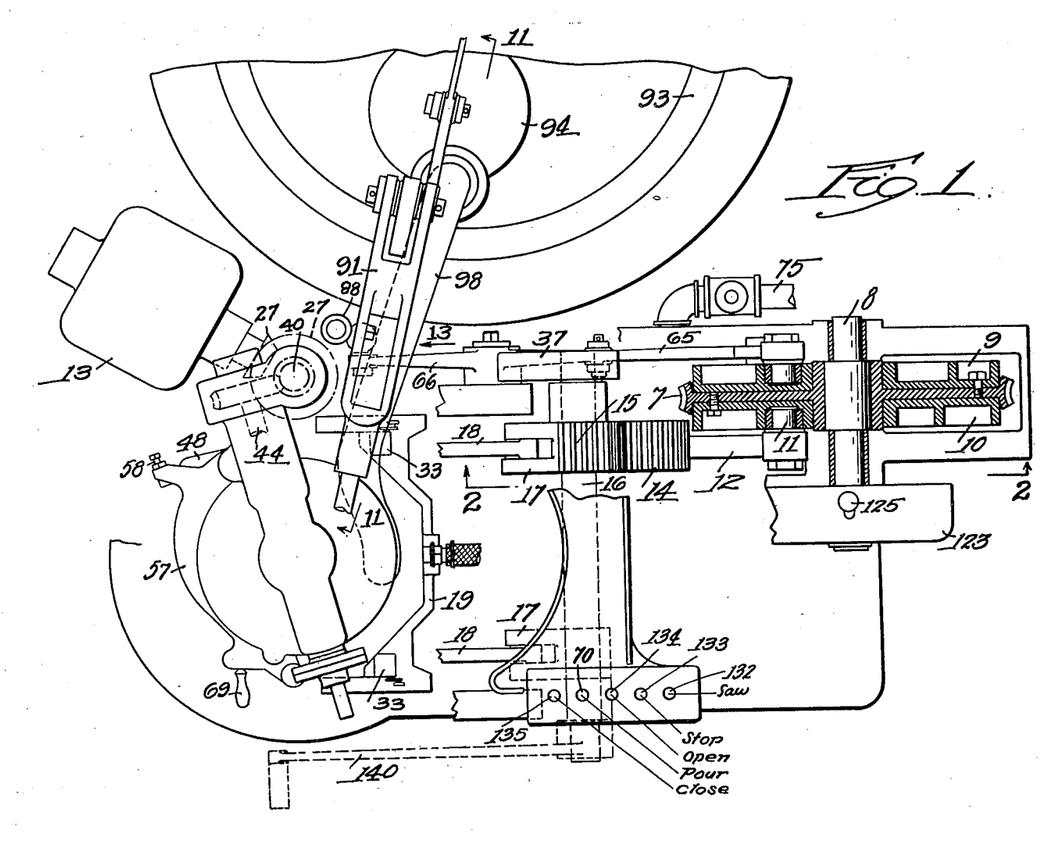
Fig. 1 is a plan of a casting machine constructed in accordance with this invention, certain parts being shown in section.
Figure 2:
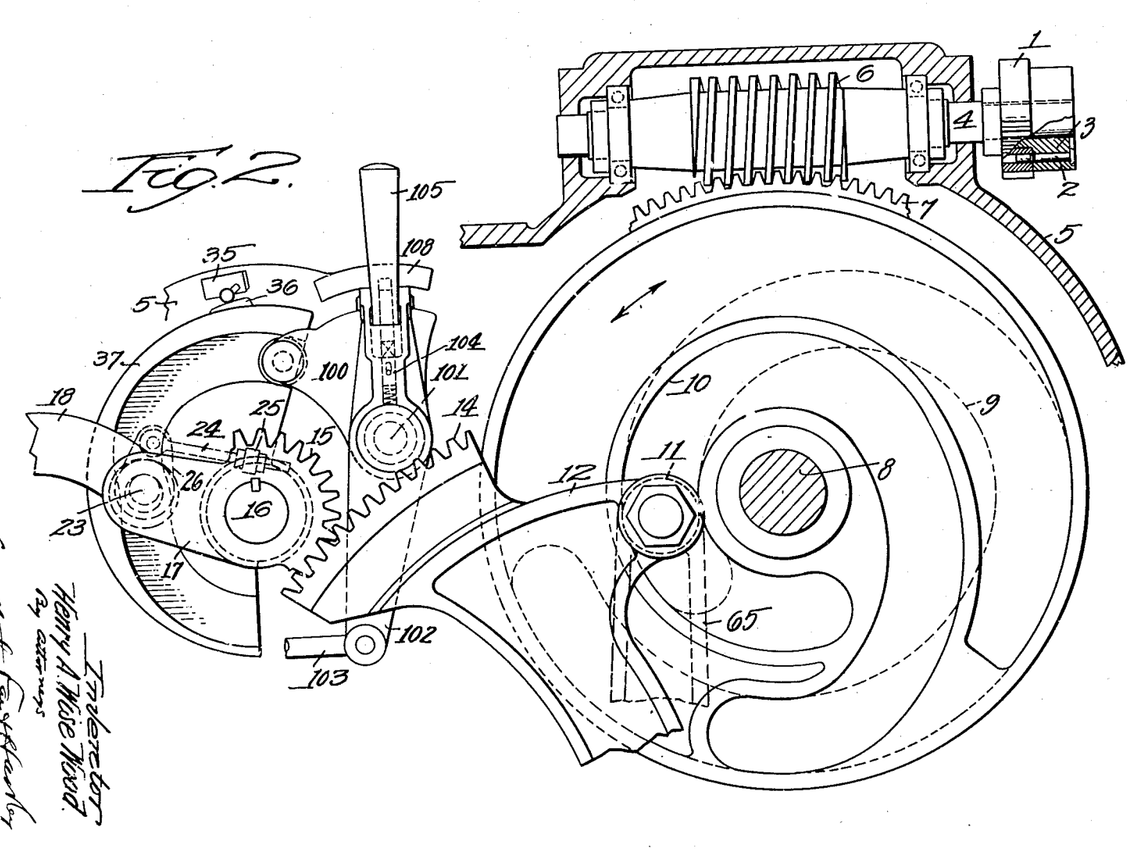
Fig. 2 is a sectional view on enlarged scale on the line 2—2 of Fig. 1, showing the cams and other mechanism for operating the pump, casting box and saw hanger cam.

Fig. 2 shows the machine where the cam toe 131 has just opened the electrical contact in the switch 128 and Fig. 20 shows the position of the cam at this time.

The angular position of the limit switch 128 is, of course, determined by the hole 126 in which the locking pin 124 is inserted. This angular position determines the point to which the cam toe 131 must travel before reversing. This, through the pump cam 9, determines the stroke of the pump and consequently the amount of metal poured into the mold. The "pour" button 70 is operative when the casting box is in the open position or the closed position. In the first case, the "pour" button causes the motor to close the casting box, pour the metal, return the pump and stop. In the second case, the metal is poured, the pump returned and the motor stopped. The "pour" button is so connected that after one pour has been made the button is rendered inoperative until the casting box is opened. This prevents the damage that would be caused by pouring one mold full of metal on the top of another.

Figure 23:
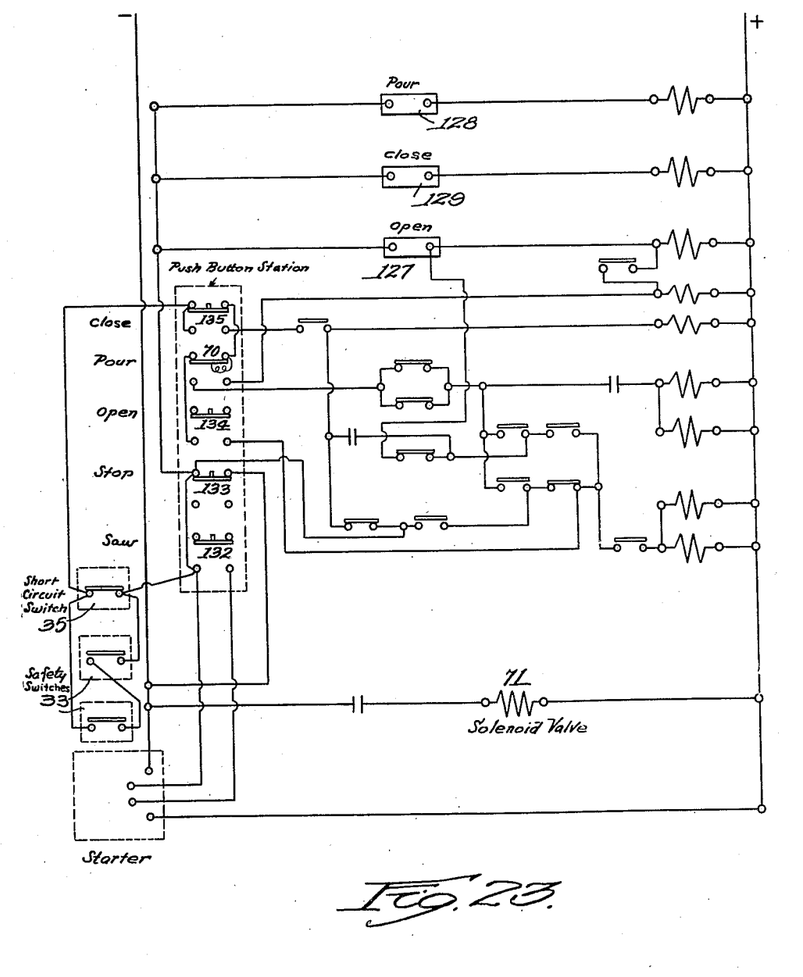
Fig. 23 is an elementary wiring diagram.

The pressing of the "pour" button 70 also energizes the solenoid 71 as stated before, thereby turning water into the cylinder and casting box. As stated, the casting box can be closed without damage to the machine by placing the matrix bar and the matrix clip in the position shown in Fig. 7 in dotted lines. In this position, an electrical contact is made through the safety switch 33. This switch is connected in the red button circuit so that neither motor will be started until contact is made in this switch. One of these switches is provided for each clip and they are connected in series, as shown in Fig. 23.

In the two positions shown in Figs. 8 and 9, with the matrix bar closed in both and the clip closed in one and open in the other, neither motor can be started. In the normal operation of the machine, however, the matrix bar closes when the casting box comes up to the cylinder and then the electrical contact is broken in the safety switch 33.

In order to prevent the stopping of the motor under this normal operation, the short-circuiting switch 35, which is attached to the frame of the machine, is closed by the lug 36 fixed to the saw cam and thus electrical contact is made in this switch, just as the matrix bars close. This contact in the switch 36 short circuits the two switches 33, making them inoperative as long as the casting box is closed.

In addition to this automatic electrical operation, it is very easy to adapt the machine for manual operation. For this purpose the extension handle 92 is inserted in the handle 91 and the shear pin 85 is removed, so that the pump can be operated manually. The stud on which the cam roller 11 is mounted is removed and the handle 140 is slipped on and then the casting box may be operated by hand. The arm 60 is removed and the handle 69 can then be used to throw in the cylinder clutch manually.

It will thus be seen that the various operations above described can be accomplished and manipulations mentioned can be provided for in a very simple manner in this machine.

Although I have illustrated and described only a single form of the invention, I am aware of the fact that modifications can be made therein by any person skilled in the art without departing from the scope of the invention as expressed in the claims. Therefore, I do not wish to be limited to all the details of construction herein shown and described, but what I do claim is:—

1. In a stereotype plate casting machine, the combination with a mold comprising a movable back and a motor for operating it, of an electric circuit in which the motor is located, a push button in the circuit for starting the motor, and means whereby when the back is opened said circuit is opened and the motor is stopped.

2. In a stereotype plate casting machine, the combination with a mold comprising a reciprocable back and a link motion for moving it, of a pair of intermeshing segmental gears, one connected with said link motion, a cam connected with the other one of said gears for swinging them back and forth to open and close the mold, means for oscillating said cam, and electrically controlled means for operating said means.

3. In a stereotype plate casting machine, the combination with a mold comprising a reciprocable back and mechanical means for moving it back and forth, of a shaft, means for oscillating said shaft, means for adjusting the oscillatory motion, and a cam on said shaft connected with said mechanical means for operating it.

4. In a stereotype plate casting machine, the combination with a mold comprising a cylinder and back, of matrix bars pivotally mounted on the back and matrix clips movably mounted on the bars, electrical control means for operating the casting box, and means whereby when the matrix bars are closed or the matrix clips open, the casting box cannot be closed by electric power.

5. In a stereotype plate casting machine, the combination with a casting box having a movable back, a matrix bar and a matrix clip, of a safety switch mounted on the back, an operating lever for the switch, means whereby when the matrix bar is closed or the matrix clip is open, the operating lever will be left in position to keep the switch open, and an electric circuit connected with said switch for controlling the operation of the casting back so that the circuit cannot be closed or the box operated by electric control unless the bar and clip is in the right position.

6. In a casting machine for stereotype plates, the combination with a casting box comprising a reciprocable back, a reversible motor connected for operating the back, safety switches in the motor circuit on the back, an operating lever for each switch mounted on the back, a pair of matrix bars and matrix clips, said matrix clips having means in position for operating said levers when the bars are open and the clips closed to close the safety switches and allow the motor to operate, said matrix clips having means whereby the levers cannot close the switches unless the clips are both open.

7. In a stereotype plate casting machine, the combination with a casting box having a movable back, a matrix bar and a matrix clip, of a safety switch, an operating lever for the switch, means whereby when the matrix clip is open, the operating lever will be left in position to keep the switch open, and an electric circuit connected with said switch for controlling the operation of the casting back so that the circuit cannot be closed by electric control unless the clip is in the right position.

8. In a stereotype plate casting machine, the combination with a mold comprising a reciprocable back and mechanical means for moving it back and forth, of a shaft, means for oscillating said shaft, a cam fixed to the shaft, two limit switches adjustable together circumferentially and in position to be operated by the cam before a rotation of the shaft is completed, electrical means controlled by said limit switches for limiting the turning of the shaft in either direction in accordance with the position of said switches, and means on said shaft for operating said mechanical means.

9. In a stereotype plate casting machine, the combination of a cam shaft, a cam on said shaft, a casting box operated and controlled by said cam, a switch cam fixed to and rotatable with said shaft, a circumferentially adjustable limit switch, means for turning said cam shaft forward and back through a part of a revolution, said cam being in position to operate the limit switch when the cam reaches a certain point, and means connected with the limit switch for stopping the rotation of said shaft, whereby the amplitude of the oscillation of the shaft will be determined by the adjustment of the limit switch.

10. In a stereotype plate casting machine, the combination with a cam shaft, a cam thereon, a casting box, means connected with said cam for opening and closing the casting box, means for operating said cam shaft through a part of the revolution back and forth, a limit switch adapted to be fixed in stationary position but adjustable, a toe for said cam for operating the limit-switch, a button, and electrical connections for controlling the operation of the means for rotating the shaft, said electrical connections comprising means whereby the pressing of said button causes the shaft to be rotated in one direction until the cam toe opens the electrical contact in the limit switch, whereby the adjustment of the limit switch will control the time for closing the mold.

11. In a casting machine, the combination with a casting box, of a close button, an open button, electrical means connected with said buttons for controlling the operation of the machine, the open button having connections for controlling the opening of the mold, the close button having means for controlling the operation of the parts to close the mold, and limit switches for disconnecting the electrical connections whenever the mold becomes closed or opened as the case may be.

12. In a stereotype plate casting machine, the combination of a shaft, means for driving said shaft, a cam fixed to the shaft, limit switches adapted to be opened and closed by said cam for limiting the rotation of the shaft in either direction, a close button, an open button, electrical connections with the close button for rotating said shaft to close the mold until stopped by its limit switch, and electrical connections with the open button for rotating said shaft in the opposite direction to open the mold.

13. In a casting machine, the combination with a casting box, of a push button station having a plurality of push buttons for controlling the machine, a close button, an open button, and a stop button, electrical means connected with said buttons for controlling the operation of the machine, the stop button having connections for stopping all parts of the machine at any time whenever it is depressed, the open button having connections for controlling the opening of the mold, the close button having means for controlling the operation of the parts to close the mold, limit switches for disconnecting the electrical connections whenever the mold becomes closed or opened as the case may be, and means whereby the opening of the electric contact in the first named limit switch renders the open button inoperative at the time when the casting box is open.

14. In a stereotype plate casting machine, the combination of a shaft, means for driving said shaft, a cam fixed to the shaft, limit switches adapted to be opened and closed by said cam for limiting the rotation of the shaft in either direction, a push button station having a series of push buttons, a close button, an open button, and a stop button, electrical connections with the close button for rotating said shaft to close the mold until stopped by its limit switch, electrical connections with the open button for rotating said shaft in the opposite direction to open the mold, electrical connections with the stop button for stopping the shaft at any time when the button is pressed, and means circumferentially adjustable about said shaft for supporting said limit switches to control the time of closing the mold.

15. In a stereotype plate casting machine, the combination of a shaft, means for driving said shaft, a cam fixed to the shaft, limit switches adapted to be opened and closed by said cam for limiting the rotation of the shaft in either direction, a push button station having a close button, a pour button, and a stop button, electrical connections with the close button for rotating said shaft to close the mold until stopped by its limit switch, electrical connections with the open button for rotating said shaft in the opposite direction to open the mold, electrical connections to the pour button for rotating said shaft in one direction to close the mold, reverse it and rotate it in the other direction to open the mold and for pouring the metal into the mold while it is closed, and means circumferentially adjustable about said shaft for supporting said limit switches to control the amount of metal poured and the time of closing the mold.

16. In a stereotype plate casting machine, the combination of a shaft, means for driving said shaft, a cam fixed to the shaft, limit switches adapted to be opened and closed by said cam for limiting the rotation of the shaft in either direction, a pour button, and a stop button, electrical connections to the pour button for rotating said shaft in one direction to close the mold, reverse it and rotate it in the other direction to open the mold and for pouring the metal into the mold while it is closed, electrical connections with the stop button for stopping the shaft at any time when the button is pressed, and means circumferentially adjustable about said shaft for supporting said limit switches to control the amount of metal poured and the time of closing the mold.

17. In a casting machine, the combination with a casting box, a rotatable core therefor, and a pump for filling the mold, of a push button station having a plurality of push buttons for controlling the machine, a close button, a pour button, an open button, and a stop button, electrical means connected with said buttons for controlling the operation of the machine, the stop button having connections for stopping all parts of the machine at any time whenever it is depressed, the open button having connections for controlling the opening of the mold, the close button having means for controlling the operation of the parts to close the mold, limit switches for disconnecting the electrical connections whenever the mold becomes closed or opened as the case may be, the pour button having electrical means for operating the pump through a complete cycle of operations and filling the mold with metal when this button is closed, and means whereby the opening of the electric contact in the first named limit switch renders the open button inoperative at the time when the casting box is open.

18. In a stereotype plate casting machine, the combination of a shaft, means for driving said shaft, a cam fixed to the shaft, limit switches adapted to be opened and closed by said cam for limiting the rotation of the shaft in either direction, a push button station having a series of push buttons, a close button, a pour button, an open button, and a stop button, electrical connections with the close button for rotating said shaft to close the mold until stopped by its limit switch, electrical connections with the open button for rotating said shaft in the opposite direction to open the mold, electrical connections to the pour button for rotating said shaft in one direction to close the mold, reversing it and rotating it in the other direction to open it and for pouring the metal into the mold while it is closed, and electrical connections with the stop button for stopping the shaft at any time when the button is pressed.

19. In a casting machine, the combination with a casting box, a rotatable core therefor, and a pump for filling the mold, of a push button station having a plurality of push buttons for controlling the machine, a close button, a pour button and an open button, electrical means connected with said buttons for controlling the operation of the machine, the open button having connections for controlling the opening of the mold, the close button having means for controlling the operation of the parts to close the mold, and limit switches for disconnecting the electrical connections whenever the mold becomes closed or opened as the case may be, the pour button having electrical means for controlling the operation of the pump through a complete cycle of operations to fill the mold with metal when this button is closed.

20. In a casting machine, the combination with a casting box, and a pump for filling the mold, of a pour button, a stop button, electrical means connected with said buttons for controlling the operation of the machine, the stop button having connections for stopping all parts of the machine at any time whenever it is depressed, and limit switches for disconnecting the electrical connections whenever the mold becomes closed or opened as the case may be, the pour button having electrical means for controlling the operation of the pump through a complete cycle of operations to fill the mold with metal when this button is closed.

21. In a stereotype plate casting machine, the combination with a cam shaft and a cam on the shaft, of means operated by said cam for closing and opening the mold, a pump for filling the mold, a pour button, electrical connections with the pour button for rotating the cam shaft in a clockwise direction until the cam opens the contact in the limit switch, means for reversing the shaft automatically and rotating it in the opposite direction until the cam allows a contact to be made in the other limit switch, and means for causing the shaft to come to a stop.

22. In a casting machine, the combination with a cam shaft and two cams thereon, of a casting box, means connected with one cam for closing and opening the casting box, a pump, means connected with the other cam for operating the pump, a cover centered on but not rotatable with said shaft, means for circumferentially adjusting the position of the cover, two limit switches carried by said cover, a cam carried by said shaft and having a toe for operating one of said switches, and means connected with said switch for reversing the shaft when it is open, whereby the adjustment of said cover determines the stroke of the pump and the amount of metal poured into the mold.

23. In a stereotype plate casting machine, the combination with a reciprocable back and a rotatable cylinder therefor, of a pump for supplying metal to the mold, an oscillatable shaft, a cam on said shaft connected for operating the back, a second cam on the shaft, a telescoping connection with said pump for operating it, and means connected with the second cam for operating the telescoping connection.

24. In a stereotype plate casting machine, the combination with a reciprocable back and a rotatable cylinder therefor, of a pump for supplying metal to the mold, an oscillatable shaft, a cam on said shaft connected for operating the back, a second cam on the shaft, a rod adjustable in length and a sleeve into which the rod extends constituting a telescoping connection for operating the pump, a shear pin connected to the rod and sleeve, whereby by removing said shear pin and inserting an extension in the pump handle the pump may be operated by hand, and means connected with the second cam for operating the telescoping connection.

25. In a stereotype plate casting machine, the combination with a semi-cylindrical back having a passage therein for cooling water, of a rotatable cylinder therefor adapted to receive cooling water inside, electrical means for controlling the operation of the back and cylinder, a pump for filling the mold with metal, an electrical control button for controlling the operation of the pump, and means connected to be set into operation by the closing of said button for introducing water into the back and cylinder.

26. In a stereotype plate casting machine, the combination with a back and cylinder, both adapted to receive water, of a water pipe having a valve for supplying water to both of them, a pump for introducing metal into the mold, a pour button for controlling the operation of said pump, electrical means for connecting a circuit and starting the pump when the pour button is pushed in, and a solenoid in series with the pour button, the plunger of said solenoid being connected with said valve to open it when the pour button is pressed in.

27. In a stereotype plate casting machine, the combination with a back and cylinder, both adapted to receive water, of a water pipe having a valve for supplying water to both of them, a pump for introducing metal into the mold, a pour button for controlling the operation of said pump, electrical means for connecting a circuit and starting the pump when the pour button is pushed in, a solenoid in series with the pour button, the plunger of said solenoid being connected with said valve to open it when the pour button is pressed in, a lever connected with said plunger for operating the valve when the electric current is not flowing through the solenoid and having a lost motion connection, whereby the electrical operation of the valve will not move the handle, and means for holding the handle yieldingly in either of its extreme positions.

28. In a stereotype plate casting machine, the combination with a back and cylinder, both adapted to receive water, of a water pipe having a valve for supplying water to both of them, a solenoid, the plunger of said solenoid being connected with said valve to open it, a weight for closing the valve when the solenoid is not energized, a lever connected with said plunger for operating the valve by hand, and means for holding said handle in either extreme position irrespective of the operation of the solenoid.

29. In a stereotype plate casting machine, the combination with a reciprocable back, and means for operating it, of a rotatable cylinder constituting the core of the back, a clutch for connecting the cylinder with a source of power, and a lever connected to operate the clutch, said lever having a lug thereon, the back having a spring-pressed lug with a slanting upper surface which when the casting back recedes from the core will engage the lug on the lever and swing the lever to close the clutch and start the cylinder into rotation, the casting back having a straight line motion and the lever and oscillatable motion about a center so related to each other that the two lugs clear each other before the casting box finishes its backward stroke.

30. In a stereotype plate casting machine, the combination with a reciprocable back and a rotatable cylinder constituting a core therefor, of a clutch for connecting the cylinder with a source of power, means operated by the back for throwing the clutch in, a lever having a roll adapted to throw out the clutch at the end of the half revolution, and a spring connected with said lever for preventing any rebound of the roller from reengaging the clutch teeth.

31. In a stereotype plate casting machine, the combination with a reciprocable back and a rotatable cylinder constituting a core therefor, of a clutch for connecting the cylinder with a source of power, and means operated by the back for throwing the clutch in, said clutch comprising a spring behind the movable part thereof, whereby, when the two sets of clutch teeth strike each other with the teeth top to top, enough free motion is provided to avoid breaking the parts.

32. In a stereotype plate casting machine, the combination with a reciprocable back and oscillatable means for reciprocating the back, of a cylinder making up the rest of the mold, a motor for rotating the cylinder, a shaft by which the cylinder is directly rotated, a clutch connecting the motor with the shaft, a lever having means for connecting and disconnecting the clutch, said back having a lug thereon adapted to operate said lever when the mold closes to close the clutch and start the cylinder rotating, and a handle on said lever for operating the clutch by hand.

33. In a stereotype plate casting machine, the combination of a shaft, means for driving said shaft, a cam fixed to the shaft, a rotatable cylinder, a swinging saw frame, saws thereon, limit switches adapted to be opened and closed by said cam for limiting the rotation of the shaft in either direction, a close button, an open button, a saw button, electrical connections with the close button for rotating said shaft to close the mold until stopped by its limit switch, electrical connections with the open button for rotating said shaft in the opposite direction to open the mold and electrical connections with the saw button for rotating the saws and the cylinder.

34. In a casting machine, the combination with a casting box, a rotatable cylinder therefor, a pump for filling the mold, and a movable saw frame having saws thereon, of a close button, an open button, electrical means connected with said buttons for controlling the operation of the machine, the open button having connections for controlling the opening of the mold and moving the saw frame up to the cylinder, the close button having means for controlling the operation of the parts to close the mold, limit switches for disconnecting the electrical connections whenever the mold becomes closed or opened as the case may be, and means whereby the opening of the electric contact in the first named limit switch renders the open button inoperative at the time when the casting box is open.

35. In a casting machine, the combination with a casting box, a rotatable core therefor, and a movable saw frame, of a push button station having a plurality of push buttons for controlling the machine, a close button, a saw button, an open button, and a stop button, electrical means connected with said buttons for controlling the operation of the machine, the stop button having connections for stopping all parts of the machine at any time whenever it is depressed, the open button having connections for controlling the opening of the mold, the close button having means for controlling the operation of the parts to close the mold, and limit switches for disconnecting the electrical connections whenever the mold becomes closed or opened as the case may be, the saw button having electrical means for controlling the operation of the saws to cut through the casting on the cylinder when this button is closed.

36. In a stereotype plate casting machine, the combination with a mold comprising a reciprocable back and a link motion for moving it, of segmental gears connected with said link motion, a cam for turning said gears back and forth to open and close the mold, means for oscillating said cam, a saw cam movable with one of said segmental gears, two limit switches adjustable together circumferentially and in position to be operated by the first named cam before a rotation of the shaft is completed, electrical means controlled by said limit switches for limiting the turning of the shaft in either direction in accordance with the position of said switches, a swinging saw frame, and means connected with the saw cam for operating said saw frame.

37. In a casting machine, the combination with a reciprocable back having matrix bars, safety switches connected with said matrix bars to prevent closing the mold when the matrix bars are not in proper position, means whereby the matrix bars close when the casting box moves up to casting position, a saw hanger frame, a saw cam having means for operating the saw hanger frame, means for oscillating the saw cam when the back moves forward or back, a short circuiting switch adapted to be closed by the saw hanger cam and electrical connections whereby said short circuiting switch short circuits the safety switches connected with the matrix bars and renders them inoperative whenever the casting box is closed.

38. In a casting machine, the combination with a reciprocable back having matrix bars, safety switches connected with said matrix bars to prevent closing the mold when the matrix bars are not in proper position, means whereby the matrix bars close when the casting box moves up to casting position, a saw hanger frame, a saw cam having means for operating the saw hanger frame, means for oscillating the saw cam when the back moves forward or back and a short circuiting switch adapted to be operated by the saw hanger cam for preventing the stopping of the machine during the normal operation thereof and adapted to be closed as the matrix bars close.

39. In a stereotype plate casting machine, the combination with a back, a rotatable cylinder and a saw hanger frame having saws thereon, of an oscillatable member having connections for reciprocating the back, a motor connected for rotating the cylinder and the saws, a saw button and electrical means controlled thereby for starting said motor into operation, said motor being adapted to operate continuously, means connected with the back for connecting the cylinder with the motor when the back closes to rotate the cylinder a half revolution, a saw cam connected with said oscillatable member and connections from the saw cam for swinging the saw hanger frame into position for the rotating saws to cut through the casting on the cylinder as the cylinder rotates.

40. In a stereotype plate casting machine, the combination with a back, a rotatable cylinder and a saw hanger frame having saws thereon, of an oscillatable gear segment having connections for reciprocating the back, means connected with the back for connecting the cylinder with a source of power when the back closes to rotate the cylinder a half revolution, a saw cam connected with said gear segment and connections from the saw cam for swinging the saw hanger frame into position for the rotating saws to cut through the casting on the cylinder as the cylinder rotates.

41. In a stereotype plate casting machine, the combination with a casting box, a cylinder for completing the mold and a saw hanger frame having saws thereon for trimming the ends of the casting on the cylinder, of an oscillating segment for operating the casting box, a saw cam movable with said segment, a lever arranged to be operated by the saw cam, a second lever, the second lever having a movable projection adapted to control its connection with the first lever, and means for connecting the second lever with the saw hanger for moving it into and out of operative position.

42. In a stereotype plate casting machine, the combination with a casting box, a cylinder for completing the mold and a saw hanger frame having saws thereon for trimming the ends of the casting on the cylinder, of an oscillating segment for operating the casting box, a saw cam movable with said segment, a lever having a roll by which it is operated by the saw cam, a second lever pivoted on the same axis as the first lever, the first lever having a notch and a stationary part of the frame having a notch, the second lever having a bell crank with a projection adapted to engage in either of said notches, whereby when engaged with the notch on the first lever the second lever will operate with the first lever as a unit and whereby when engaged in the stationary notch the second lever will remain stationary and whereby when the bell crank is in neutral position the second lever will not be operated by the saw cam but can be operated by hand and means for connecting the second lever with the saw hanger for moving it into and out of operative position.

43. In a stereotype plate casting machine, the combination with a casting box, a cylinder for completing the mold and a saw hanger frame having saws thereon for trimming the ends of the casting on the cylinder, of a saw cam, a lever operated by the saw cam, a second lever pivoted on the same axis as the first lever, the first lever having a notch and a stationary part of the frame having a notch, the second lever having a projection adapted to engage in either of said notches, whereby when the second lever is in neutral position the second lever will not be operated by the saw cam but can be operated by hand and means for connecting the second lever with the saw hanger frame for moving it into and out of operative position.

44. The combination with a shaft, and means for oscillating said shaft, of a cam carried by the shaft, a cam roller therefor, a pivoted arm having a removable stud on which the cam roller is mounted, a reciprocable casting back, means connected with said arm for operating the casting back, and a handle on the casting back for operating it by hand when the stud and roller are removed.

45. In a stereotype plate casting machine, the combination with a casting box having a movable back, a matrix bar and a matrix clip, of a safety switch, means whereby when the matrix bar is closed or the matrix clip is open, the switch will be held open, and an electric circuit connected with said switch for controlling the operation of the casting back so that the circuit cannot be closed or the box operated by electric control unless the bar and clip are in the right position.

46. In a stereotype plate casting machine, the combination with a mold comprising a reciprocable back and a link motion for moving it, of a pair of intermeshing segmental gears, one connected with said link motion, means connected with the other one of said gears for swinging them back and forth to open and close the mold, and electrically controlled means for operating said means.

In testimony whereof I have hereunto affixed my signature.

HENRY A. WISE WOOD.